(12) United States Patent
Miyashita

(10) Patent No.: US 9,323,117 B2
(45) Date of Patent: Apr. 26, 2016

(54) ELECTRO-OPTICAL APPARATUS AND ELECTRONIC DEVICE

(75) Inventor: Tomoaki Miyashita, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 856 days.

(21) Appl. No.: 13/426,233

(22) Filed: Mar. 21, 2012

(65) Prior Publication Data
US 2012/0242964 A1 Sep. 27, 2012

(30) Foreign Application Priority Data

Mar. 22, 2011 (JP) .................................. 2011-062307

(51) Int. Cl.
*G03B 21/18* (2006.01)
*G02F 1/1345* (2006.01)
*G03B 21/16* (2006.01)

(52) U.S. Cl.
CPC ............ *G02F 1/13452* (2013.01); *G03B 21/16* (2013.01)

(58) Field of Classification Search
CPC .. G02F 1/133305; G02G 1/133; G03B 21/16; G09F 9/00; H05K 1/14
USPC ................................ 353/7, 52–61; 349/5, 6, 7
See application file for complete search history.

(56) References Cited

U.S. PATENT DOCUMENTS

| 5,892,657 | A | 4/1999 | Inoue | |
|---|---|---|---|---|
| 6,471,357 | B1 * | 10/2002 | Hara et al. | ....................... 353/57 |
| 7,829,992 | B2 | 11/2010 | Sugino et al. | |
| 2009/0080154 | A1 * | 3/2009 | Hirabayashi et al. | ......... 361/690 |
| 2011/0024760 | A1 * | 2/2011 | Kimura | ........................... 257/59 |
| 2011/0134621 | A1 * | 6/2011 | Saimen | ........................ 361/803 |

FOREIGN PATENT DOCUMENTS

| JP | H02-074984 A | 3/1990 |
|---|---|---|
| JP | H09-246683 A | 9/1997 |
| JP | 2005-055662 A | 3/2005 |
| JP | 2006-048019 A | 2/2006 |
| JP | 2010-102219 A | 5/2010 |
| WO | 2007/129458 A1 | 11/2007 |

* cited by examiner

*Primary Examiner* — Sultan Chowdhury
*Assistant Examiner* — Danell L Owens
(74) *Attorney, Agent, or Firm* — Maschoff Brennan

(57) ABSTRACT

Flexible substrates are drawn from two terminals provided on a TFT substrate, respectively, and IC chips are mounted on both flexible substrates. Both flexible substrates are placed so that positions of the IC chips provided on both flexible substrates overlap with each other.

12 Claims, 2 Drawing Sheets

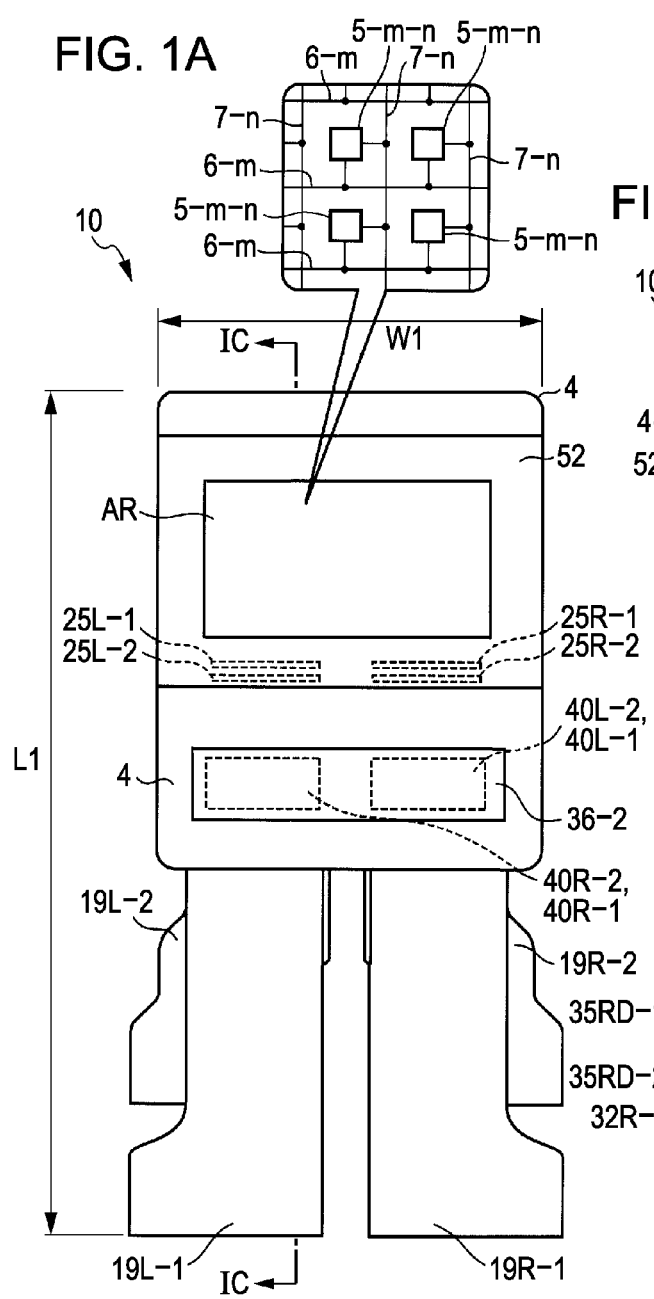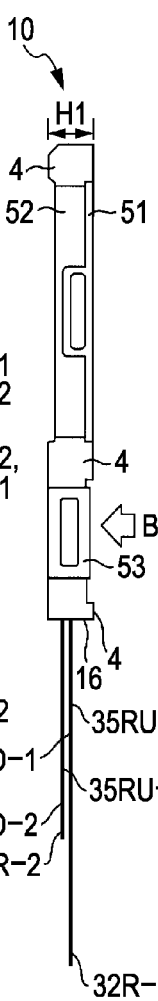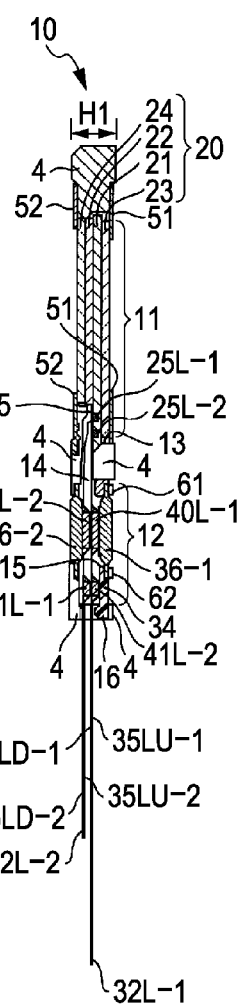

ELECTRO-OPTICAL APPARATUS AND ELECTRONIC DEVICE

BACKGROUND

1. Technical Field

The present invention relates to an electro-optical apparatus that is mounted on a mobile phone, a projector or the like, as a display apparatus.

2. Related Art

In this type of electro-optical apparatus, there is an apparatus having a structure called a COF (Chip On Film). In the electro-optical apparatus of the COF structure, a driving circuit driving two substrates is separated from a liquid crystal panel including a liquid crystal layer and the two substrates interposing the same therebetween, and the driving circuit is mounted on a flexible substrate that is drawn from end portions of the substrates to the outside of the panel. According to the electro-optical apparatus of the COF structure, the size of the liquid crystal panel can be reduced compared to an apparatus having a structure in which the driving circuit is mounted in the liquid crystal panel.

JP-A-2006-48019 discloses a technique related to a liquid crystal display apparatus which is an electro-optical apparatus adopting the COF structure. A liquid crystal panel of the liquid crystal display apparatus disclosed in JP-A-2006-48019 has a liquid crystal, a TFT (Thin Film Transistor) substrate facing each other with the liquid crystal therebetween, a counter substrate, and two cover glasses facing each other with both substrates therebetween. In one end portion of the TFT substrate in the liquid crystal panel, a flexible substrate formed of a flexible material is drawn outward, and a panel driving IC is placed on the light incident direction side surface (the side in which a light source is placed) of the flexible substrate. A frame of rectangular frame shape is fixed at the irradiation direction side (the side opposite the side in which the light source is placed) in the liquid crystal panel of the liquid crystal display apparatus, and a light shielding plate of a rectangular frame shape is fixed at the incident direction side. In the liquid crystal display apparatus, the light shielding plate prevents light from being irradiated from the light source toward the liquid crystal display panel reaching the panel driving panel IC. For this reason, it is possible to prevent an occurrence of the problem that light from the light source reaches the panel driving IC and the panel driving IC is erroneously operated.

However, in this type of electro-optical apparatus, when continuously operating the panel driving IC over a long period of time, in some cases, heat of the IC increases and causes a malfunction, and the display image is degraded. Thus, in order to satisfactorily maintain the image quality of the display image, there is a need to moderately radiate the heat generated by the operation of the driving IC, but, in the technique disclosed in JP-A-2006-48019, such a countermeasure has not been made.

SUMMARY

An advantage of some aspects of the invention is, in an electro-optical apparatus adopting a COF structure, to provide a technical means which is able to effectively radiate the heat of the panel driving IC mounted on the flexible substrate drawn from the liquid crystal panel in the electro-optical apparatus adopting the COF structure.

According to an aspect of the invention, there is provided an electro-optical apparatus which includes an electro-optical panel section having a first substrate formed with a circuit, a plurality of flexible substrates drawn from an end portion of the first substrate so as to form a multilayered shape, and a plurality of flexible substrate modules which has IC chips each fixed to the same position of each surface of the plurality of flexible substrates forming the multilayered shape, when the plurality of flexible substrates forming the multilayered shape is viewed in the stacking direction.

In the aspect of the invention, the IC chips on the plurality of flexible substrates are fixed to the same position of the respective surfaces of the plurality of flexible substrates forming the multilayered shape, respectively, when the plurality of flexible substrates is viewed in the stacking direction. For this reason, heat generated by the driving of the IC chips on the respective flexible substrates is easily transmitted to the IC chips of the upper and lower layers. Thus, it is possible to effectively radiate heat generated by the driving of the IC chip.

In the electro-optical apparatus, the IC chip may be an electro-optical panel driving IC chip that supplies the electro-optical panel section with a driving signal, and the plurality of flexible substrates forming the multilayered shape may be filled with a material having thermal conductivity higher than air, between the superimposed flexible substrates, in a position where the electro-optical panel driving IC chip is placed. According to this, heat is more easily transmitted between the flexible substrate modules, whereby radiation efficiency can be further increased.

Furthermore, the plurality of flexible substrates forming the multilayered shape may be provided with a heat radiating material which covers the position where the respective electro-optical panel driving IC chips are placed in an overlapped manner, from the outside in the stacking direction. According to this, the radiation efficiency can be further increased.

Furthermore, the plurality of flexible substrate modules may be separately stacked in the transverse width direction of the electro-optical apparatus by multiple layers. According to this, sufficient radiation efficiency can be obtained without increasing the thickness of the electro-optical apparatus.

BRIEF DESCRIPTION OF THE DRAWINGS

The invention will be described with reference to the accompanying drawings, wherein like numbers reference like elements.

FIGS. 1A to 1C are a front view, a left side view, and a cross-sectional view of an electro-optical apparatus that is an embodiment of the invention.

DESCRIPTION OF EXEMPLARY EMBODIMENTS

A: Configuration

Figure 2:
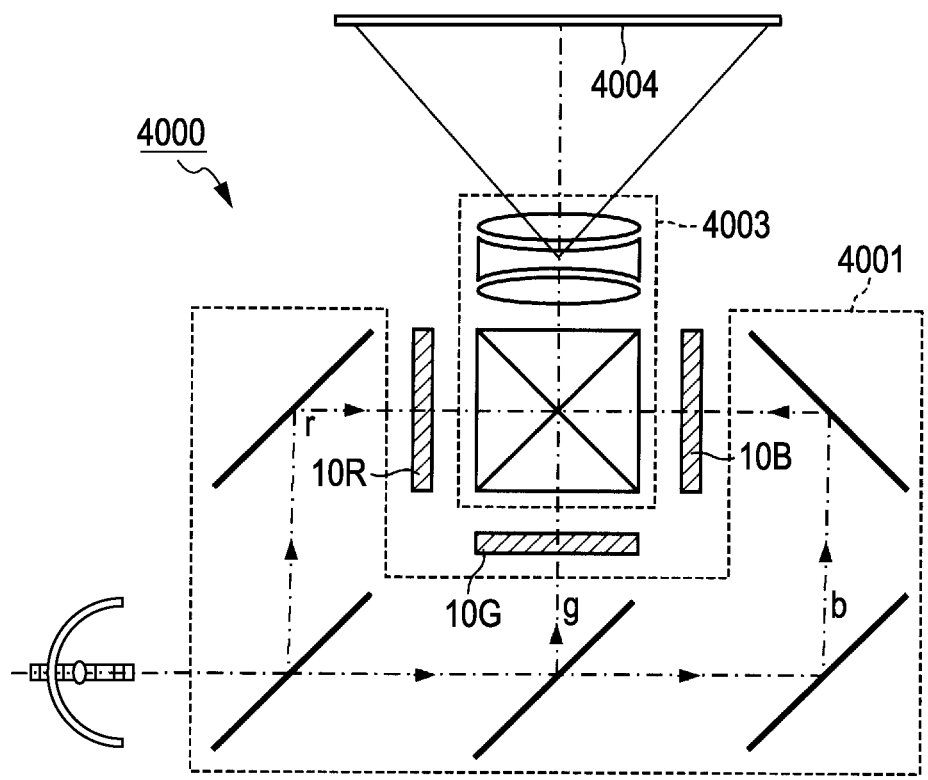
FIG. 2 is a schematic diagram of a projection type projector that adopts the electro-optical apparatus of an embodiment of the invention.

FIG. 1A is the front view of an electro-optical apparatus 10 which is an embodiment of the invention. FIG. 1B is a right side view of the electro-optical apparatus 10. FIG. 1C is a cross-sectional view taken along line IC-IC of FIG. 1A. The electro-optical apparatus 10 is operated as a liquid crystal display (for example, a liquid crystal display that is used in a projection type liquid crystal projector as shown in FIG. 2) which irradiates the front side with light to be irradiated from a light source (not shown) to the back surface of the electro-optical apparatus 10 as an image formed of M×N pixels PIX.

The electro-optical apparatus 10 has a liquid crystal panel section 20; flexible substrate modules 19L-1, 19L-2, 19R-1, and 19R-2 connected to an overhang section 25 (an end section) protruding from a counter substrate 22 of a TFT substrate 21 of the liquid crystal panel section 20; radiation plates 36-1 and 36-2 placed in a heating location of the flexible substrate module, that is, in a position corresponding to a location where the IC chip 40 is placed; a radiation plate spacer 34 for holding the radiation plates 36-1 and 36-2 at a predetermined interval; and a frame 4 accommodating them.

The frame 4 of the electro-optical apparatus 10 forms a thin rectangular shape having sizes of a transverse width W1 (for example, W1=100 mm), a longitudinal width L1 (for example, L1=150 mm), and a thickness H1 (for example, H1=10 mm). As shown in FIG. 1C, between the front surface and the back surface in the frame 4, two opening sections 11 and 12 separated into one end side and the other end side in the longitudinal width L-1 direction are provided. A thin width gap section 14 is extended between the opening section 11 and the opening section 12 in the frame 4.

A liquid crystal panel section 20 is housed in the opening section 11 of the frame 4. The liquid crystal panel section 20 has a liquid crystal layer LQ (not shown), a TFT substrate 21 and a counter substrate 22 facing each other with the liquid crystal layer LQ interposed therebetween, and light-transmissive dust-proof substrates 23 and 24 facing each other with both substrates 21 and 22 therebetween. More specifically, the liquid crystal layer LQ is formed of a mixture of multiple types of nematic liquid crystal which is the electro-optical substance. The liquid crystal layer LQ is enclosed in a closed space which is surrounded by the TFT substrate 21, the counter substrate 22, and a seal member (not shown) placed along the peripheral end sections of both substrates 21 and 22. In a region AR facing the liquid crystal layer LQ on the TFT substrate 21, M×N pixel electrodes 5-$m$ (m=1 to M)-n (n=1 to N) forming a matrix of M lines and N rows are provided. Between the pixel electrodes 5-$m$-$n$ adjacent to each other in the longitudinal width L1 direction on the TFT substrate 21, a scanning line 6-$m$ extending in the transverse width W1 direction is laid. Between the pixel electrodes 5-$m$-$n$ adjacent to each other in the transverse width W1 direction on the TFT substrate 21, a data line 7-$n$ extending in the longitudinal width L1 direction is laid.

Furthermore, the overhang section 25 of the TFT substrate 21 is provided with four external circuit connection terminals 25L-1, 25L-2, 25R-1, and 25R-2 as shown by a dotted line in FIG. 1A. Specifically, in an inner position slightly to the inside of the end section of the opening section 12 side, two external circuit connection terminals 25L-2 and 25R-2 are provided. The external circuit connection terminals 25L-2 and 25R-2 are arranged in the transverse width W1 direction so as to provide a slight space between them. In a position between the external circuit connection terminals 25L-2 and 25R-2 on the TFT substrate 21 and the region AR, two external circuit connection terminals 25L-1 and 25R-1 are provided. The external circuit connection terminals 25L-1 and 25R-1 are arranged in the transverse width W1 direction so as to provide a slight space between them.

Moreover, a flexible substrate module 19L-1 is connected to the external circuit connection terminal 25L-1, and the flexible substrate module 19L-2 is connected to the external circuit connection terminal 25L-2. Furthermore, a flexible substrate module 19R-1 is connected to the external circuit connection terminal 25R-1, and a flexible substrate module 19R-2 is connected to the external circuit connection terminal 25R-2. Thus, the flexible substrate module 19L-1 and the flexible substrate module 19L-2 are placed so as to be interposed with each other, and the flexible substrate module 19R-1 and the flexible substrate module 19R-2 are placed so as to be superimposed with each other. On the TFT substrate 21, a wiring (not shown) connecting a data line 7-$n$, a scanning line 6-$m$, and the external circuit connection terminals 25L-1, 25L-2, 25R-1, and 25R-2 is laid. On the counter substrate 22, a counter electrode (not shown) facing the pixel electrode 5-$m$ (m=1 to M)-n (n=1 to N) of the TFT substrate 21 is provided. One pixel PIX is formed by the pixel electrode 5-$m$-$n$ in the liquid crystal layer LQ and the liquid crystal interposed between the counter electrodes.

Hooks 51 and 52 are mounted to a portion in the frame 4 provided with the opening section 11. The hooks 51 and 52 are metallic members that are bent in an approximately U-shape. Each of the hooks 51 and 52 are provided with rectangular openings having substantially the same dimensions as the region AR. The hooks 51 and 52 face each other so as to cover a liquid crystal panel section 20 in the opening section 11, and are fixed to the frame 4 by fitting end sections thereof to each other. The dust-proof substrate 23 of the liquid crystal panel section 20 is exposed to the front side via the opening of the hook 51, and dust-proof substrate 24 of the liquid crystal panel section 20 is exposed to the back side via the opening of the hook 52.

In the opening section 12 of the frame 4, the flexible substrate modules 19L-1, 19L-2, 19R-1, and 19R-2 are placed. The flexible substrate module 19L-1 has a flexible substrate 32L-1, and an IC chip 40L-1 and a condenser 41L-1 mounted on the substrate 32L-1. The flexible substrate module 19L-2 has a flexible substrate 32L-2, and an IC chip 40L-2 and a condenser 41L-2 mounted on the substrate 32L-2. The flexible substrate module 19R-1 has a flexible substrate 32R-1, and an IC chip 40R-1 and a condenser 41R-1 mounted on the substrate 32R-1. The flexible substrate module 19R-2 has a flexible substrate 32R-2, and an IC chip 40R-2 and a condenser 41R-2 mounted on the substrate 32R-2.

The IC chip 40L-1 in the flexible substrate module 19L-1 plays a role as a first electro-optical panel driving apparatus that drives the pixel electrode of the region AR-1 in a region AR-i (i=1 to 4) where the region AR of the liquid crystal panel section 20 is divided into four in the transverse width W1 direction. The IC chip 40L-2 in the flexible substrate module 19L-2 plays a role as a second electro-optical panel driving apparatus that drives the pixel electrode of the region AR-2 of the liquid crystal panel section 20. The IC chip 40R-1 in the flexible substrate module 19R-1 plays a role as a third electro-optical panel driving apparatus that drives the pixel electrode of the region AR-3 of the liquid crystal panel section 20. The IC chip 40R-2 in the flexible substrate module 19R-2 plays a role as a fourth electro-optical panel driving apparatus that drives the pixel electrode of the region AR-4 of the liquid crystal panel section 20.

Among the four flexible substrate modules 19L-1, 19L-2, 19R-1, and 19R-2, the flexible substrates 32L-1 and 32L-2 of the flexible substrate modules 19L-1 and 19L-2 are drawn to the gap section 14 so as to form a multilayered shape from the external circuit connection terminals 25L-1 and 25L-2 of the TFT substrate 21. Both substrates 32L-1 and 32L-2 are extended in parallel toward the outside of the outer wall surface 16, while maintaining the gap of both substrates 32L-1 and 32L-2 in the thickness direction H1. The flexible substrates 32R-1 and 32R-2 of the flexible substrate modules 19R-1 and 19R-2 are drawn to the gap section 14 so as to form a multilayered shape from the external circuit connection terminals 25R-1 and 25R-2 of the TFT substrate 21. Both substrates 32R-1 and 32R-2 are extended in parallel toward the outside of the outer wall surface 16, while maintaining the gap of both substrates 32R-1 and 32R-2 in the thickness direction H1.

The IC chip 40L-1 of the flexible substrate module 19L-1 and the IC chip 40L-2 of the flexible substrate module 19L-2 are fixed onto the respective substrates 32L-1 and 32L-2 so that the positions of the IC chips 40L-1 and 40L-2 are identical to each other when viewing the IC chips 40L-1 and 40L-2 in the stacking direction of the flexible substrates 32L-1 and 32L-2. Furthermore, the IC chip 40R-1 of the flexible substrate module 19R-1 and the IC chip 40R-2 of the flexible substrate module 19R-2 are fixed onto the respective substrates 32R-1 and 32R-2 so that the positions of the IC chips 40R-1 and 40R-2 are identical to each other when viewing the IC chips 40R-1 and 40R-2 in the stacking direction of the flexible substrates 32R-1 and 32R-2.

More specifically, the IC chip 40L-1 of the flexible substrate module 19L-1 is provided in a portion that is superimposed with the opening section 12 on the surface 35LU-1 of an opposite side of the flexible substrate 32L-2 of both sides 35LU-1 and 35LD-1 of the flexible substrate 32L-1. A condenser 41L-1 of the flexible substrate module 19L-1 is provided at a position separated from the IC chip 40L-1 on the surface 35LU-1 of the flexible substrate 32L-1 to the outer wall surface 16 side.

The IC chip 40L-2 of the flexible substrate module 19L-2 is provided at a position right behind the IC chip 40L-1 on the surface 35LU-2 of the side of the flexible substrate 32L-1 of both sides 35LU-2 and 35LD-2 of the flexible substrate 32L-2. The condenser 41L-2 of the flexible substrate module 19L-2 is provided at a position right behind the condenser 41L-1 on the surface 35LU-2 of the flexible substrate 32L-2. Furthermore, an adhesive ADH (not shown) formed of a material having a thermal conductivity higher than air is filled between a portion around the IC chip 40L-2 on the surface 35LU-2 of the flexible substrate 32L-2 and a position just behind the IC chip 40L-1 in the surface 35LD-1 of the flexible substrate 32L-1.

The IC chip 40R-1 of the flexible substrate module 19R-1 is provided in a portion superimposed with the opening section 12 on the surface 35RU-1 of an opposite side of the flexible substrate 32R-2 of both surfaces 35RU-1 and 35RD-1 of the flexible substrate 32R-1. The condenser 41R-1 of the flexible substrate module 19R-1 is provided at a position separated from the IC chip 40R-1 on the surface 35RU-1 of the flexible substrate 32R-1 to the outer wall surface 16 side.

The IC chip 40R-2 of the flexible substrate module 19R-2 is provided at a position right behind the IC chip 40R-1 on the surface 35RU-2 of the side of the flexible substrate 32R-1 of both sides 35RU-2 and 35RD-2 of the flexible substrate 32R-2. The condenser 41R-2 of the flexible substrate module 19R-2 is provided at a position right behind the condenser 41R-1 on the surface 35RU-2 of the flexible substrate 32R-2. Furthermore, an adhesive ADH (not shown) formed of a material having thermal conductivity higher than air is filled between a portion around the IC chip 40R-2 on the surface 35RU-2 of the flexible substrate 32R-2 and a position just behind of the IC chip 40R-1 in the surface 35RD-1 of the flexible substrate 32R-1.

In a position interposing the position, where the IC chips 40L-1 and 40L-2 of the flexible substrate modules 19L-1 and 19L-2 and the IC chips 40R-1 and 40R-2 of the flexible substrate modules 19R-1 and 19R-2 in the opening section 12 of the frame 4 are placed, from both sides, radiation plates 36-1 and 36-2 are placed. The radiation plate 36-2 is engaged with the frame 4 and is positioned, and the radiation plate 36-1 is engaged with the radiation spacer 34 and is positioned.

More specifically, the radiation plate spacer 34 is a PPS (Polyphenylene Sulfide) resin member having an outline of approximately the same dimensions as that of the opening section 12. The radiation plate spacer 34 is provided with an opening of a rectangular shape. An inner edge portion in the opening of the radiation plate spacer 34 facing the longitudinal width L1 direction is provided with a convex portion. The radiation plates 36-1 and 36-2 are metallic members of an approximately rectangular shape. An outer edge portion in the radiation plate 36-1 facing the longitudinal width L1 direction is provided with a convex portion. An outer edge portion in the radiation plate 36-2 facing the longitudinal width L1 direction is provided with a convex portion. The radiation plate 36-1 is inserted into the radiation plate spacer 34 so as to engage the convex portion of the radiation plate 36-1 with the convex portion of the opening of the radiation plate spacer 34. Furthermore, the radiation plate 36-2 is inserted so as to engage the convex portion of the radiation plate 36-2 with the inner edge of the opening section 12 in the frame 4.

A hook 53 is mounted to a portion in the frame 4 provided with the opening section 12 from direction B. The hook 53 is a metallic member that is bent in the form of an approximately U-shape. The hook 53 is provided with an opening of an approximately rectangular shape having dimensions slightly smaller than the radiation plates 36-1 and 36-2. The hook 53 faces the opening section 12 so as to cover the radiation plates 36-1 and 36-2 in the opening section 12, and is fixed to the frame 4 by fitting the end portion of the hook 53 to the frame 4. Between the hook 53 and the convex portion of the radiation plate 36-1, pressure bar springs 61 and 62 playing a role in biasing the convex portion of the radiation plate 36-1 to the side of the convex portion of the radiation plate the spacer 34 in the state where the hook 53 is fixed to the frame 4.

The configuration mentioned above details the electro-optical apparatus 10 that is the present embodiment. According to the present embodiment, four effects can be obtained as below. Firstly, in the present embodiment, the IC chips 40L-1 and 40L-2 of the flexible substrate modules 19L-1 and 19L-2 are fixed to the same position of the flexible substrates 32L-1 and 32L-2 when viewing the IC chips 40L-1 and 40L-2 in the stacking direction. Furthermore, the IC chips 40R-1 and 40R-2 of the flexible substrate modules 19R-1 and 19R-2 are fixed to the same position of the flexible substrates 32R-1 and 32R-2 when viewing the IC chips 40R-1 and 40R-2 in the stacking direction. For this reason, heat that is generated by the driving of the IC chips 40L-1, 40L-2, 40R-1, and 40R-2 on the flexible substrate is easily transmitted to the IC chips of the upper and lower layers. Thus, it is possible to effectively radiate heat generated by the driving of the IC chips 40L-1, 40L-2, 40R-1, and 40R-2.

Secondly, in the present embodiment, an adhesive ADH is filled between the flexible substrate 32L-1 of the flexible substrate module 19L-1 in the stacked flexible substrate modules 19L-1 and 19L-2 and the IC chip 40L-2 of the flexible substrate module 19L-2 of the layer below that. Furthermore, an adhesive ADH is filled between the flexible substrate 32R-1 of the flexible substrate module 19R-1 in the stacked flexible substrate modules 19R-1 and 19R-2 and the IC chip 40R-2 of the flexible substrate module 19R-2 of the layer below that. For this reason, heat is easily transmitted between the flexible substrate modules 19L-1 and 19L-2 and the flexible substrate modules 19R-1 and 19R-2, whereby the radiation efficiency can be increased.

Thirdly, in the present embodiment, the radiation plate 36-1 is provided above the uppermost flexible substrate modules 19L-1 and 19R-1 in the stacked flexible substrate module, and the radiation plate 36-2 is also provided below the lowermost flexible substrate modules 19L-2 and 19R-2. Thus, the radiation efficiency can be further improved.

Fourthly, in the present embodiment, four flexible substrate modules 19L-1, 19L-2, 19R-1, and 19R-2 are separately stacked in the transverse width W1 direction of the electro-optical apparatus 10 two layers at a time. Thus, it is possible to obtain sufficient radiation efficiency without increasing the thickness H1 of the electro-optical apparatus 10.

FIG. 2 is a schematic diagram of the projection type display apparatus (a three-plate type projector) 4000 to which the electro-optical apparatus 10 is applied. The projection type display apparatus 4000 includes three electro-optical apparatuses 10 (10R, 10G, 10B) corresponding to different display colors (red, green, and blue). An illumination optical system 4001 supplies the electro-optical apparatus 10R with a red component r of an emitting beam from an illumination apparatus (a light source) 4002, supplies the electro-optical apparatus 10G with a green component g, and supplies electro-optical apparatus 10B with a blue component b. The respective electro-optical apparatuses 10 function as an optical modulator (a light valve) that modulates each monochromatic light to be supplied from the illumination optical system 4001 depending on the display image. The projection optical system 4003 synthesizes and projects the emitting beam from the respective electro-optical apparatuses 10 to the projection surface 4004.

Furthermore, the liquid crystal projector 1100 is provided with a sirocco fan (not shown) for sending cooling air to three electro-optical apparatuses 10 (10R, 10G, and 10B). The sirocco fan includes an approximately cylindrical-shaped member having a plurality of blades at the side thereof, and the cylindrical-shaped member is rotated around the axis thereof, whereby the blades create an airflow. In addition, from such a principle, airflow produced by the sirocco fan swirls in a spiral shape. Such a cooling airflow is fed to the respective electro-optical apparatuses 10 (10R, 10G, and 10B) through an air duct not shown in FIGS. 1A to 1C, and is delivered from nozzles provided near the respective electro-optical apparatuses 10 (10R, 10G, and 10B) to each of the respective electro-optical apparatuses 10 (10R, 10G, and 10B), thereby cooling the radiation plates 36-1 and 36-2.

B: Modification

As mentioned above, the embodiment of the invention has been described, but the modifications described below may of course be added to the embodiment.

(1) In the embodiment mentioned above, the number of lamination layers of the plurality of flexible substrate modules 19L-1, 19L-2, 19R-1, and 19R-2 in the thickness direction H1 may be equal to or greater than three.

(2) In the embodiment mentioned above, the radiation plates 36-1 and 36-2 are provided at both sides of the thickness direction H1 in the stacked flexible substrate modules 19L-1, 19L-2, 19R-1, and 19R-2. However, the radiation plate may be provided only in any one side of the side of the uppermost flexible substrate modules 19L-1 and 19R-1 in the thickness direction H1 and the side of the lowermost flexible substrate modules 19L-2 and 19R-2.

(3) In the embodiment mentioned above, four flexible substrate modules 19L-1, 19L-2, 19R-1, and 19R-2 are separately placed in the transverse width W1 direction of the electro-optical apparatus 10 two layers at a time. However, the placement number of the plurality of flexible substrate modules in the transverse width W1 direction may be three or more.

(4) In the embodiment mentioned above, the adhesive ADH is filled between the portion around the IC chip 40L-2 on the surface 35LU-2 of the flexible substrate 32L-2 and the portion right behind the IC chip 40L-1 in the surface 35LU-1 of the flexible substrate 32L-1, and between the portion around the IC chip 40R-2 on the surface 35LU-2 of the flexible substrate 32R-2 and the portion right behind the IC chip 40L-1 in the surface 35LU-1 of the flexible substrate 32R-1. However, another material (for example, grease) having a thermal conductivity higher than air, may be substituted for the ADH.

(5) The liquid crystal panel section 20 is only an example of the electro-optical panel. In regard to the electro-optical panel applied to the invention, a distinction between a self-light emitting type in which light is emitted by itself and a non-light emitting type in which transmittance and reflectance of external beam are changed, and a distinction between a current-driving type to be driven by the supply of the current and a voltage-driving type to be driven by the application of electric field (voltage) are unquestioned. For example, the invention is applied to an electro-optical panel which uses various electro-optical elements such as an organic EL element, an inorganic EL element, an LED (Light Emitting Diode), an electric field electron emitting element (a FE (Field Emission) element), a surface-conduction type electron emitting element (a SE (Surface Conduction Electron Emitter) element), a ballistic electron emitting element (a BS (Ballistic Electron Emitting) element), an electrophoresis element, and an electrochromic element. That is, the electro-optical element is included as a driven element (typically, a display element in which the gradation is controlled depending on a gradation signal) using an electro-optical substance in which the gradation (optical characteristics such as transmittance and brightness) is changed depending on an electrical action such as the supply of current and the application of voltage (electric field).

Furthermore, as an electronic device to which the invention can be applied, in addition to the projection type liquid crystal projector described with reference to FIG. 2, a mobile type personal computer, a mobile phone, a liquid crystal TV, a view finder-type and monitor direct viewing type video tape recorder, a car navigation apparatus, a pager, an electronic organizer, a calculator, a word processor, a work station, a video phone, a POS terminal, an apparatus including a touch panel or the like can be adopted. Moreover, the invention can be applied to various electronic devices.

This application claims priority from Japanese Patent Application No. 2011-062307 filed in the Japanese Patent Office on Mar. 22, 2011, the entire disclosure of which is hereby incorporated by reference in its entirely.

What is claimed is:
1. An electro-optical apparatus including:
an electro-optical panel section having a first substrate formed with a circuit;
a plurality of flexible substrates drawn from an end portion of the first substra as to form a multilayered shape,
an IC chip fixed to the same position of each surface of the plurality of flexible substrates forming the multilayered shape, when the plurality of flexible substrates forming the multilayered shape is viewed in a stacking direction, and
a material filled in a position where the IC chip is placed between the flexible substrates,
wherein the IC chip supplies the electro-optical panel section with a driving signal, and
the material has thermal conductivity higher than air.

2. The electro-optical apparatus according to claim 1,
wherein the plurality of flexible substrates forming the multilayered shape is provided with a heat radiating material which covers a position where the respective electro-optical panel driving IC chips are placed in an overlapped manner, from the outside in the stacking direction.

3. The electro-optical apparatus according to claim 1,
wherein the plurality of flexible substrate modules is separately stacked in a transverse width direction of the electro-optical apparatus by multiple layers.

4. An electronic device including the electro-optical apparatus according to claim 1.

5. A projection type display apparatus comprising:
the electro-optical device according to claim 1; and
a cooling device that sends cooling air to the electro-optical apparatus.

6. An electro-optical apparatus comprising:
an electro-optical panel that has a first substrate, a first terminal group above a plane of the first substrate and a second terminal group above the plane of the first substrate,
a first flexible substrate that is electrically connected to the first terminal group;
a second flexible substrate that is electrically connected to the second terminal group, the second flexible substrate at least partially overlaps with the first flexible substrate when viewed from a direction perpendicular to the plane of the first substrate;
a first IC chip that is provided on a first surface of the first flexible substrate; and
a second IC chip that is provided on a second surface of the second flexible substrate and overlaps with the first IC chip when viewed from the direction perpendicular to the plane of the first substrate, and
a material filled in a position where the IC chip is placed between the superimposed flexible substrates,
wherein the IC chip supplies the electro-optical panel section with a driving signal, and
the material has thermal conductivity higher than air.

7. The electro-optical apparatus according to claim 6,
the first flexible substrate having a third terminal group that is electrically connected to the first terminal group,
the second flexible substrate having a forth terminal group that is electrically connected to the second terminal group.

8. The electro-optical apparatus according to claim 6,
the second surface of the second flexible substrate is a side of the first flexible substrate of the second flexible substrate.

9. The electro-optical apparatus according to claim 6,
wherein the first surface of the first flexible substrate is opposite to a third surface of the second flexible substrate, the third surface of the second flexible substrate being opposite to the second surface of the second flexible substrate.

10. The electro-optical apparatus according to claim 6, further comprising a first heat radiation plate on a third surface of the first flexible substrate,
the first heat radiation plate at least partially overlaps with the first IC chip when viewed in plan viewed from the direction.

11. The electro-optical apparatus according to claim 6, further comprising a second heat radiation plate on a forth surface of the second flexible substrate,
the second heat radiation plate at least partially overlaps with the second IC chip when viewed in plan viewed from the direction.

12. The electro-optical apparatus according to claim 10,
the first heat radiation plate is larger than the first IC chip.

* * * * *